US011890542B2

United States Patent
Wan et al.

(10) Patent No.: US 11,890,542 B2
(45) Date of Patent: Feb. 6, 2024

(54) VIRTUAL OBJECT CONTROL METHOD AND APPARATUS, TERMINAL, AND STORAGE MEDIUM

(71) Applicant: TENCENT TECHNOLOGY (SHENZHEN) COMPANY LTD, Guangdong (CN)

(72) Inventors: Yu Lin Wan, Shenzhen (CN); Xun Hu, Shenzhen (CN); Shan Dong Su, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 237 days.

(21) Appl. No.: 17/508,390

(22) Filed: Oct. 22, 2021

(65) Prior Publication Data

US 2022/0040580 A1 Feb. 10, 2022

Related U.S. Application Data

(63) Continuation of application No. PCT/CN2021/092000, filed on May 7, 2021.

(30) Foreign Application Priority Data

Jun. 5, 2020 (CN) .......................... 202010507547.6

(51) Int. Cl.
*A63F 13/56* (2014.01)
(52) U.S. Cl.
CPC ..................................... *A63F 13/56* (2014.09)
(58) Field of Classification Search
CPC ........ A63F 13/20; A63F 13/219; A63F 13/40; A63F 13/45; A63F 13/52; A63F 13/56; A63F 13/58; A63F 13/70
See application file for complete search history.

(56) References Cited

U.S. PATENT DOCUMENTS

2015/0273331 A1* 10/2015 McMain ................ A63F 13/45
463/31
2017/0340959 A1* 11/2017 Tang ...................... A63F 13/426
(Continued)

FOREIGN PATENT DOCUMENTS

| CN | 104915117 B | 3/2017 |
| CN | 109011571 A | 12/2018 |

(Continued)

OTHER PUBLICATIONS

"FA Royal Compulsory Lesson", 55_A Hook Takes Off! The correct posture of Thyme Xuanchar(39)s strategy?—Beep, beep, beep. The prince glory, bilibili, URL :<https:/\23.tv/sYgl3t>, Sep. 6, 2017 (9 pages total).

(Continued)

*Primary Examiner* — Omkar A Deodhar
(74) *Attorney, Agent, or Firm* — Sughrue Mion, PLLC

(57) ABSTRACT

A virtual object control method and apparatus, a terminal, and a storage medium. The method includes: displaying a virtual scene interface, the virtual scene interface including a first virtual object, second virtual objects, and ability controls; determining, in response to a first trigger operation on a first ability control, a target virtual object from the second virtual objects and according to the first trigger operation, and controlling the first virtual object to cast a first ability on the target virtual object; determining the target virtual object as an ability casting target corresponding to a second ability when a second trigger operation on a second ability control meets an ability continuous casting condition, the second trigger operation being triggered during ability casting of the first ability; and controlling the first virtual object to cast the second ability on the target virtual object.

20 Claims, 8 Drawing Sheets

(56) References Cited

U.S. PATENT DOCUMENTS

| | | | |
|---|---|---|---|
| 2019/0060745 A1* | 2/2019 | He | A63F 13/847 |
| 2019/0143216 A1 | 5/2019 | Tortosa et al. | |
| 2019/0286439 A1 | 9/2019 | Rao | |
| 2021/0146248 A1* | 5/2021 | Chen | A63F 13/837 |
| 2022/0001280 A1* | 1/2022 | Lee | A63F 13/23 |

FOREIGN PATENT DOCUMENTS

| | | |
|---|---|---|
| CN | 109865286 A | 6/2019 |
| CN | 110624241 A | 12/2019 |
| CN | 110955370 A | 4/2020 |
| CN | 111672116 A | 9/2020 |

OTHER PUBLICATIONS

"Royal Glory-How Does Riacke Do 456 Yuan Second, Blade Burst?", Favorite Dreams Three Kingdoms, Youku Video, URL: <https://mr.baidu.com/r/mPQb2PFllkw?f=cp&u=955c55242854467a>, Oct. 18, 2017 (3 pages total).

Office Action dated Jun. 2, 2021 from the China National Intellectual Property Administration in CN Application No. 202010507547.6.

Invitation to Respond to Written Opinion dated May 10, 2023 in Singaporean Application No. 11202112177Q.

International Search Report for PCT/CN2021/092000 dated Aug. 6, 2021 (PCT/ISA/210).

Written Opinion for PCT/CN2021/092000 dated Aug. 6, 2021 (PCT/ISA/237).

Translation of International Search Report for PCT/CN2021/092000 dated Aug. 6, 2021 (PCT/ISA/210).

Communication dated Jul. 14, 2022, issued in European Application No. 21782869.8.

Extended European Search Report dated Jun. 27, 2022, issued in European Application No. 21782869.8.

Office Action dated Oct. 12, 2023 in Korean Application No. 10-2021-7035181.

[FA King Compulsory Course] 55_One hook to take away!, Bilibili.com, Online video published Sep. 6, 2017 (1 page total) Accessed via the Internet: https://www.bilibili.com/video/BV11x411x7ML/?p=1&share_medium=android&share_plat=android&share_source=COPY&share_tag=s_i&timestamp=1621471633&unique_k=sYgl3t.

\* cited by examiner

VIRTUAL OBJECT CONTROL METHOD AND APPARATUS, TERMINAL, AND STORAGE MEDIUM

CROSS-REFERENCE TO RELATED APPLICATION(S)

This application is a continuation application of International Application No. PCT/CN2021/092000, filed on May 7, 2021, which claims priority to Chinese Patent Application No. 202010507547.6, filed with the China National Intellectual Property Administration on Jun. 5, 2020, the disclosures of which are incorporated by reference in their entireties.

FIELD

The disclosure relates to the field of computer technologies, and in particular, to a virtual object control method and apparatus, a terminal, and a storage medium.

BACKGROUND

In an application based on a two-dimensional or three-dimensional (3D) virtual environment, for example, a multiplayer online battle arena (MOBA), a user may control a virtual object in a virtual scene to cast abilities on other virtual objects, virtual buildings, and the like, and compete against each other using specific victory conditions as goals.

In the related art, when the user clicks/taps a plurality of ability controls in a short period, abilities may be cast on different virtual objects. However, this ability casting effect does not meet the user's expectation (casting abilities on the same virtual object in a short period), affecting accuracy of quick ability casting.

SUMMARY

Embodiments of the disclosure may provide a virtual object control method and apparatus, a terminal, and a storage medium, which may improve casting accuracy during abilities continuous casting. The technical solutions are as follows.

According to an aspect, an embodiment of the disclosure may provide a virtual object control method, performed by a terminal, the method including:
  displaying a virtual scene interface, the virtual scene interface including a first virtual object, at least two second virtual objects, and at least two ability controls, the first virtual object and the second virtual objects being located in a virtual scene, and the ability controls being configured to control the first virtual object to cast abilities;
  determining, in response to a first trigger operation on a first ability control, a target virtual object from the at least two second virtual objects and according to the first trigger operation, and controlling the first virtual object to cast a first ability on the target virtual object;
  determining the target virtual object as an ability casting target corresponding to a second ability in response to a second trigger operation on a second ability control meeting an ability continuous casting condition, the second trigger operation being triggered during ability casting of the first ability; and controlling the first virtual object to cast the second ability on the target virtual object.

According to another aspect, an embodiment of the disclosure may provide a virtual object control apparatus, including:
  a display module, configured to display a virtual scene interface, the virtual scene interface including a first virtual object, at least two second virtual objects, and at least two ability controls, the first virtual object and the second virtual objects being located in a virtual scene, and the ability controls being configured to control the first virtual object to cast abilities;
  a first control module, configured to determine, in response to a first trigger operation on a first ability control, a target virtual object from the at least two second virtual objects and according to the first trigger operation, and control the first virtual object to cast a first ability on the target virtual object;
  a first determining module, configured to determine the target virtual object as an ability casting target corresponding to a second ability in response to a second trigger operation on a second ability control meeting an ability continuous casting condition, the second trigger operation being triggered during ability casting of the first ability; and
  a second control module, configured to control the first virtual object to cast the second ability on the target virtual object.

According to another aspect, an embodiment of the disclosure may provide a terminal, including a processor and a memory, the memory storing at least one instruction, at least one program, a code set, or an instruction set, the at least one instruction, the at least one program, the code set, or the instruction set being loaded and executed by the processor to implement the virtual object control method according to the foregoing aspect.

According to another aspect, an embodiment of the disclosure may provide a non-volatile computer readable memory storage medium, storing computer code that when executed by at least one processor causes the at least one processor to perform:
  displaying a virtual scene interface, the virtual scene interface comprising a first virtual object, at least two second virtual objects, and at least two ability controls, the first virtual object and the second virtual objects being located in a virtual scene, and the ability controls being configured to control the first virtual object to cast abilities;
  determining, in response to a first trigger operation on a first ability control, a target virtual object from the at least two second virtual objects and according to the first trigger operation, and controlling the first virtual object to cast a first ability on the target virtual object;
  determining the target virtual object as an ability casting target corresponding to a second ability, when a second trigger operation on a second ability control meets an ability continuous casting condition, the second trigger operation being triggered during ability casting of the first ability; and
  controlling the first virtual object to cast the second ability on the target virtual object.

According to another aspect, an embodiment of the disclosure may provide a computer program product, the computer program product, when executed by a processor, being used for implementing the virtual object control method.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
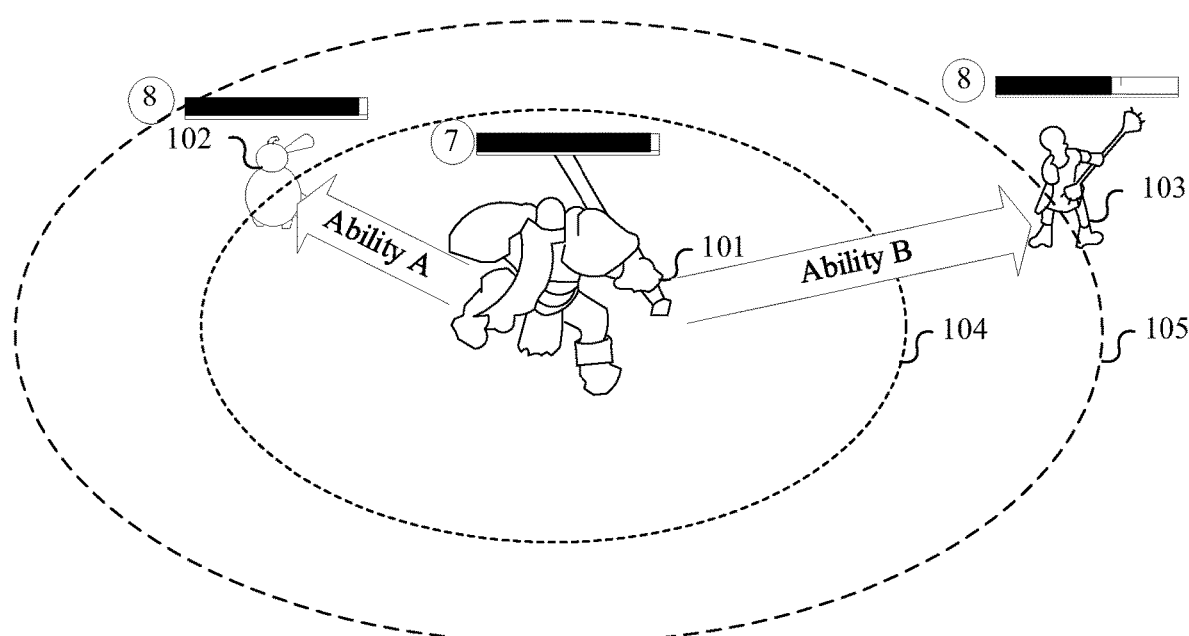
FIG. 1 is a schematic implementation diagram of an ability continuous casting process in the related art.

To make objectives, technical solutions, and advantages of the disclosure clearer, the following further describes implementations of the disclosure in detail with reference to the accompanying drawings.

The term "plurality of" mentioned in the specification means two or more. "And/or" describes an association relationship for describing associated objects and represents that three relationships may exist. For example, A and/or B may represent the following three cases: only A exists, both A and B exist, and only B exists. The character "/" generally indicates an "or" relationship between the associated objects.

The terms involved in the example embodiments of the disclosure are briefly introduced as follows:

Virtual scene: a virtual scene displayed (or provided) when an application is run on a terminal. The virtual scene may be a simulated world of the real world, a semi-simulated semi-fictional 3D world, or an entirely fictional 3D world. The virtual scene may be any one of a two-dimensional virtual scene, a 2.5-dimensional virtual scene, and a 3D virtual scene.

In an embodiment, the virtual scene is further used for a virtual scene battle between at least two virtual objects, and virtual resources available to the at least two virtual objects are provided in the virtual scene. In an embodiment, the virtual scene includes a lower left corner region and an upper right corner region that are symmetrical. Virtual objects on two opposing camps occupy the regions respectively, and the objective of each side is to destroy a target building/fort/base/crystal deep in the opponent's region to win victory.

Virtual object: a movable object in a virtual scene. The movable object may be at least one of a virtual human, a virtual animal, and an animated human character. When the virtual scene is a 3D virtual scene, the virtual object may be a 3D model. Each virtual object has a shape and a volume in the 3D virtual scene, and occupies some space in the 3D virtual scene.

In an example embodiment, the virtual object is a 3D character constructed based on 3D human skeleton technology. The virtual object wears different skins to implement different appearances. The virtual object may also be implemented by using a 2.5-dimensional model or a two-dimensional model, which is not limited in the embodiments of the disclosure.

Ability: an ability in the embodiments of the disclosure is an ability cast by a virtual character and used for modifying an attribute value of a virtual object, another virtual object, or both a virtual object and another virtual object. A virtual object has at least one ability, and different virtual objects correspond to different abilities. An ability of a virtual character may be obtained and upgraded during level upgrading, and a virtual object may obtain an ability of another virtual object.

In an example embodiment, according to ability effects, abilities may be divided into: a damage ability (used to decrease a health point of a virtual object), a shield ability (used to add a shield for a virtual object), an acceleration ability (used to increase a moving speed of a virtual object), a deceleration ability (used to decrease a moving speed of a virtual object), an imprison ability (used to restrict a movement of a virtual object for a certain duration), a forced displacement ability (used to force a virtual object to move), a silence ability (used to restrict a virtual object from casting an ability for a certain duration), a restore ability (used to restore a health point or an energy value of a virtual object), a field of view ability (used to obtain/shield the field of view within a certain range or another virtual characters), a passive ability (ability that can be triggered when performing an normal attack), and the like. This is not limited in this embodiment.

In an example embodiment, according to an ability casting manner, abilities may be divided into a targeted ability and a non-targeted ability. The targeted ability is an ability specified to an ability receiver, that is, after a targeted ability is specified to an ability casting target, the ability casting target is definitely affected by the ability. The non-targeted ability is an ability pointing to a specified direction, range, or region, and a virtual object located in the direction, range, or region is affected by the ability.

A MOBA game is an arena game in which different virtual teams on at least two opposing camps occupy respective map regions in a virtual scene, and compete against each other using specific victory conditions as goals. The victory condition includes, but is not limited to, at least one of occupying forts or destroy forts of the opposing camps, killing virtual objects in the opposing camps, surviving in a specified scenario and time, seizing a specific resource, and outscoring the opponent within a specified time. The battle arena game may take place in rounds. The same map or different maps may be used in different rounds of the battle arena game. Each virtual team includes one or more virtual objects, for example, 1 virtual object, 2 virtual objects, 3 virtual objects, or 5 virtual objects.

A MOBA game is a game in which several bases are provided in a virtual scene, and users on different camps control virtual characters to battle in the virtual scene, occupy bases or destroy the base of the opposing camp. For example, in the MOBA game, the users may be divided into two opposing camps. The virtual characters controlled by the users are scattered in the virtual scene to compete against each other, and the victory condition is to destroy or occupy all enemy bases. The MOBA game takes place in rounds. A duration of a round of the MOBA game is from a time point at which the game starts to a time point at which the victory condition is met.

In the MOBA game, a user may control a virtual object to move in a virtual scene, and can trigger the virtual object to cast a corresponding ability by using an ability control. When a trigger operation on an ability control is received, the terminal determines, according to an ability casting range corresponding to an ability, an ability casting target from virtual objects located in the ability casting range, so as to control the virtual object to cast an ability on the ability casting target.

Because different abilities correspond to different ability casting ranges, when a virtual object casts different abilities at the same position, different abilities may correspond to different ability casting targets. For example, as shown in FIG. 1, a second virtual object 102 and a third virtual object 103 are around a first virtual object 101. When a tap operation on an ability control corresponding to an ability A is received, the terminal determines, according to an ability casting range 104 corresponding to the ability A, the second virtual object 102 with the lowest health point within the range as an ability casting target. When a tap operation on an ability control corresponding to an ability B is received, the terminal determines, according to an ability casting range 105 corresponding to the ability B, the third virtual object 103 with the lowest health point within the range as an ability casting target.

By using the foregoing ability casting target determining methods, each ability casting of the terminal is regarded as an independent procedure. Correspondingly, there is no correlation between ability casting targets of ability casting. However, during actual applications, the user may quickly trigger different abilities, to cause damage to the same virtual object in a short time period. If the foregoing method is adopted, when different abilities indicate different ability casting targets, different abilities may be cast on different objects, which affects accuracy of ability casting.

In this embodiment of the disclosure, by introducing an ability casting target inheritance mechanism, when casting abilities continuously a current ability can inherit an ability casting target of a previous ability (during casting), and does not search an ability casting target according to a conventional searching rule. Therefore, different abilities cast continuously can be cast on the same ability casting target, so as to cause damage to the same virtual object in a short period and to improve accuracy of ability casting.

Figure 2:
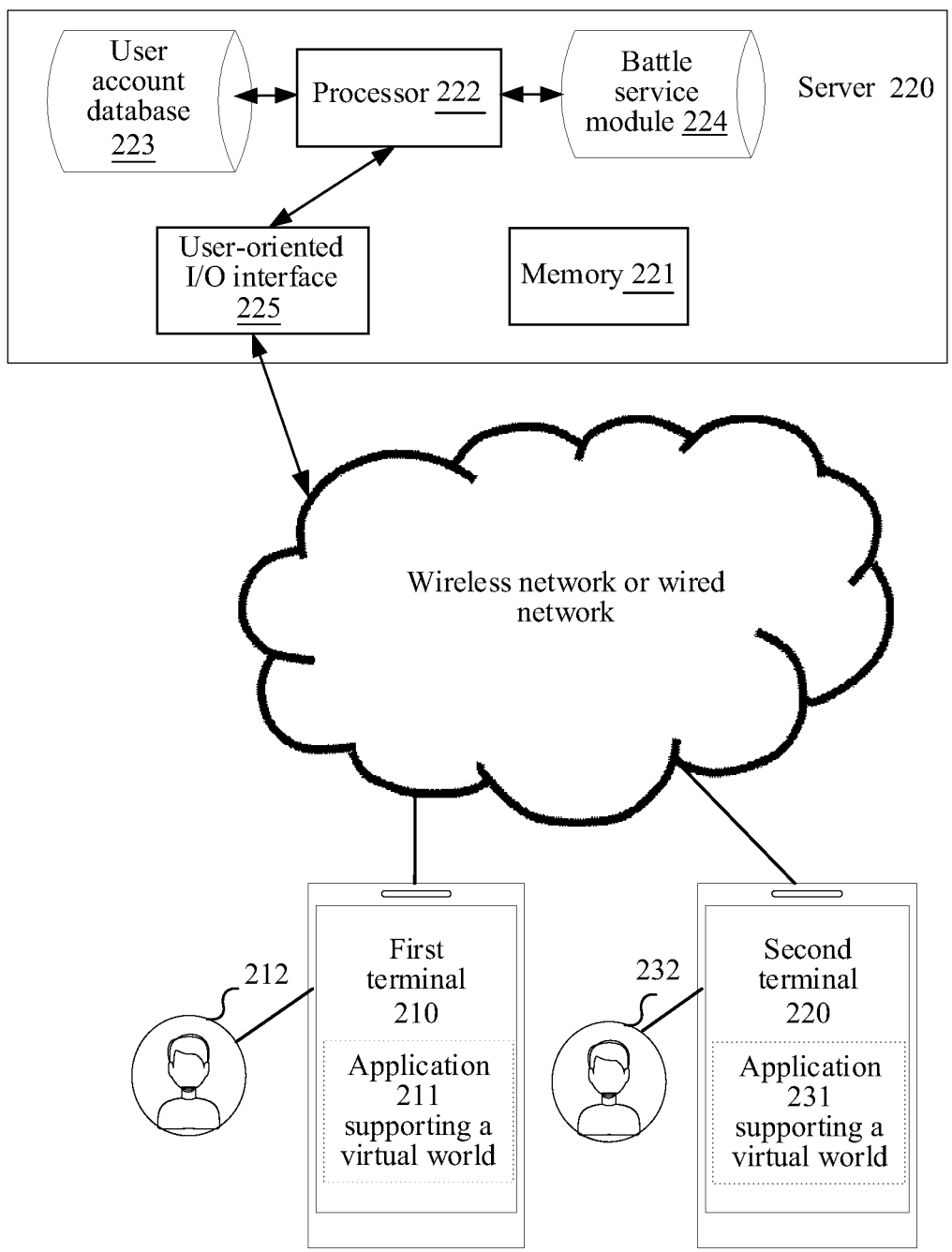
FIG. 2 is a schematic diagram of an implementation environment according to an example embodiment of the disclosure.

FIG. 2 is a schematic diagram of an implementation environment according to an embodiment of the disclosure. The implementation environment may include a first terminal 210, a server 220, and a second terminal 230.

An application 211 supporting a virtual scene, for example, a multiplayer online battle program, is installed and run on the first terminal 210. When the first terminal 210 runs the application 211, a user interface (UI) of the application 211 is displayed on a screen of the first terminal 210. The application 211 may be any one of a military simulation program, a MOBA game, a battle royale shooting game, and a simulation game (SLG).

In this embodiment, an example in which the application 211 is a MOBA game is used for description. The first terminal 210 is a terminal used by a first user 212. The first user 212 uses the first terminal 210 to control a first virtual object located in a virtual scene to perform activities, and the first virtual object may be referred to as a master virtual object of the first user 212. The activities of the first virtual object include, but are not limited to: at least one of body postures adjusting, crawling, walking, running, riding, flying, jumping, driving, picking, shooting, attacking, throwing, and ability casting. For example, the first virtual object is a first virtual character such as a simulated character or a cartoon character.

An application 231 supporting a virtual scene, for example, a multiplayer online battle program, is installed and run on the second terminal 230, and the application 231. When the second terminal 230 runs the application 231, a UI of the application 231 is displayed on a screen of the second terminal 230. The client may be any one of a military simulation program, a MOBA game, a battle royale shooting game, and an SLG.

In this embodiment, an example in which the application 231 is a MOBA game is used for description. The second terminal 230 is a terminal used by a second user 232. The second user 232 uses the second terminal 230 to control a second virtual object located in a virtual scene to perform activities, and the second virtual object may be referred to as a master virtual character of the second user 232. For example, the second virtual object is a second virtual character, such as a simulated character or a cartoon character.

In an embodiment of the disclosure, the first virtual object and the second virtual object are located in the same virtual scene. The first virtual object and the second virtual object may belong to the same camp, the same team, or the same organization, may be friends of each other, or may have a temporary communication permission. The first virtual object and the second virtual object may belong to different camps, different teams, different organizations, or may be enemies of each other.

The applications installed on the first terminal 210 and the second terminal 230 are the same, or the applications installed on the two terminals are the same type of applications on different operating system platforms (Android system or iOS system). The first terminal 210 may generally refer to one of a plurality of terminals, and the second terminal 230 may generally refer to another one of the plurality of terminals. In this embodiment, the first terminal 210 and the second terminal 230 are merely used as an example for description. The first terminal 210 and the second terminal 230 are of the same or different device types, and the device type includes at least one of a smartphone, a tablet computer, an e-book reader, a digital player, a laptop, and a desktop computer.

Although FIG. 2 shows only two terminals, a plurality of other terminals may access the server 220 in different embodiments. In an embodiment, one or more terminals are terminals corresponding to a developer. A developing and editing platform for the application supporting a virtual scene is installed on the terminal. The developer can edit and update the application on the terminal and transmit an updated application installation package to the server 220 through a wired or wireless network. The first terminal 210 and the second terminal 230 can download an application installation package from the server 220 to update the application.

The first terminal 210, the second terminal 230, and the another terminal are connected to the server 220 through a wireless network or a wired network.

The server 220 includes at least one of one server, a server cluster including a plurality of servers, a cloud computing platform, and a virtualization center. The server 220 is configured to provide a backend service for an application supporting a 3D virtual scene. For example, the server 220 is responsible for primary computing work, and the terminal is responsible for secondary computing work; or the server 220 is responsible for secondary computing work, and the terminal is responsible for primary computing work; or the server 220 and the terminals perform collaborative computing by using a distributed computing architecture among each other.

In a schematic example, the server 220 includes a memory 221, a processor 222, a user account database 223, a battle service module 224, and a user-oriented input/output (I/O) interface 225. The processor 222 is configured to load instructions stored in the server 220, and process data in the user account database 223 and the battle service module 224. The user account database 223 is configured to store data of user accounts used by the first terminal 210, the second terminal 230, and the other terminals, for example, avatars of the user accounts, nicknames of the user accounts, battle effectiveness indexes of the user accounts, and service zones of the user accounts. The battle service module 224 is configured to provide a plurality of battle rooms for the users to battle, for example, a 1V1 battle room, a 3V3 battle room, a 5V5 battle room, and the like. The user-oriented I/O interface 225 is configured to establish communication between the first terminal 210 and/or the second terminal 230 via a wireless network or a wired network for data exchange.

Figure 3:
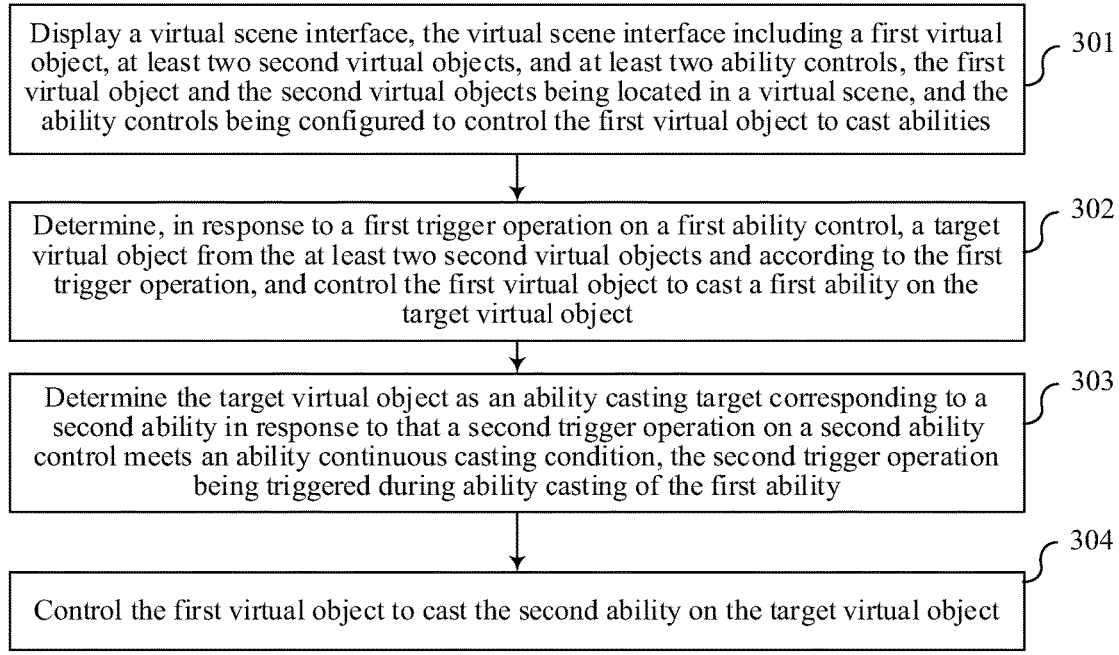
FIG. 3 is a flowchart of a virtual object control method according to an example embodiment of the disclosure.

FIG. 3 is a flowchart of a virtual object control method according to an example embodiment of the disclosure. An example in which the method is used in the first terminal 210 or the second terminal 230 in the implementation environment shown in FIG. 2 or other terminals in the implementation environment is used to describe this embodiment. The method includes the following operations:

Operation 301: Display a virtual scene interface, the virtual scene interface including a first virtual object, at least two second virtual objects, and at least two ability controls, the first virtual object and the second virtual objects being located in a virtual scene, and the ability controls being configured to control the first virtual object to cast abilities.

The second virtual object may include a virtual object belonging to the same camp as the first virtual object, or may include a virtual object belonging to a different camp from the first virtual object.

In some embodiments, both the first virtual object and the second virtual object are virtual objects controlled by users in a battle. Alternatively, the first virtual object may be a virtual object controlled by a user in a battle, but the second virtual object may be a virtual object controlled by a server, that is, an artificial intelligence (AI) virtual object.

In an example embodiment, the virtual scene interface includes a virtual scene picture and a control layer located on an upper layer of the virtual scene picture, and the ability control is located on the control layer. In addition to the ability control, a data bar, a movement control, a map control, a normal attack control, a virtual prop control, a message control, a record control, and other UI controls may alternatively be set on the control layer. This is not limited in this embodiment.

The virtual scene is a virtual scene with arbitrary boundary shapes, and the first virtual object is located in a visible range of the virtual scene interface. The first virtual object may be located at a visual center of the virtual scene picture, that is, located at a center of a virtual scene picture obtained by observing the virtual scene by using a third-person perspective.

Perspective refers to an observation angle at which observation is performed in a virtual scene from a first-person perspective or a third-person perspective of a virtual character. In an embodiment of the disclosure, the perspective is an angle for observing the virtual character through a camera model in the virtual scene.

In an example embodiment, the camera model automatically follows the virtual object in the virtual scene. That is, when a position of the virtual object in the virtual scene changes, a position of the camera model following the virtual object in the virtual scene changes simultaneously, and the camera model is always within a preset distance range of the virtual object in the virtual scene.

In the automatic following process, relative positions of the camera model and the virtual object may remain unchanged. The third-person perspective is used as an example for description in this embodiment of the disclosure in which the camera model is located behind the virtual object (for example, the head and the shoulders of the virtual character).

In some embodiments, the ability control adopts a button, and the first virtual object may be controlled to cast corresponding abilities on other virtual objects by triggering the button.

Operation 302: Determine, in response to a first trigger operation on a first ability control, a target virtual object from the at least two second virtual objects and according to the first trigger operation, and control the first virtual object to cast a first ability on the target virtual object.

In an embodiment of the disclosure, the first ability corresponding to the first ability control is an ability having an active casting function, and an ability casting target (that is, a virtual object affected by the ability) of the first ability is a virtual object belonging to the same camp as the first virtual object, or is a virtual object belonging to different camps from the first virtual object. In this embodiment of the disclosure, the ability casting target of the first ability is the target virtual object in the second virtual objects. The target virtual object is at least one virtual object.

In an example embodiment of the disclosure, the first trigger operation is at least one of a tap operation, a double-tap operation, a press operation, a drag operation, and a long press operation. An operation type of the first trigger operation is related to a casting manner of the first ability. For example, when the first ability is a targeted ability, the first trigger operation is a tap operation, and when the first ability is a non-targeted ability, the first trigger operation is a drag operation.

In some embodiments, the same ability control corresponds to at least two trigger operations. For example, an ability control corresponds to two trigger operations, which are respectively used for actively selecting an ability casting target (direction or range) or automatically selecting an ability casting target (direction or range).

In an embodiment of the disclosure, the first trigger operation is used for triggering the terminal to determine a target virtual object (automatic searching) from at least one second virtual object according to a target automatic searching rule. Alternatively, the first trigger operation is used for triggering the terminal to determine a specified virtual object in at least one second virtual object as a target virtual object (actively aiming). The specified virtual object is indicated by the first trigger operation.

In an example embodiment, when the first virtual object casts the first ability, the first virtual object presents a corresponding ability casting animation. Alternatively, the terminal controls the first virtual object to perform a corresponding ability casting action.

Figure 4:
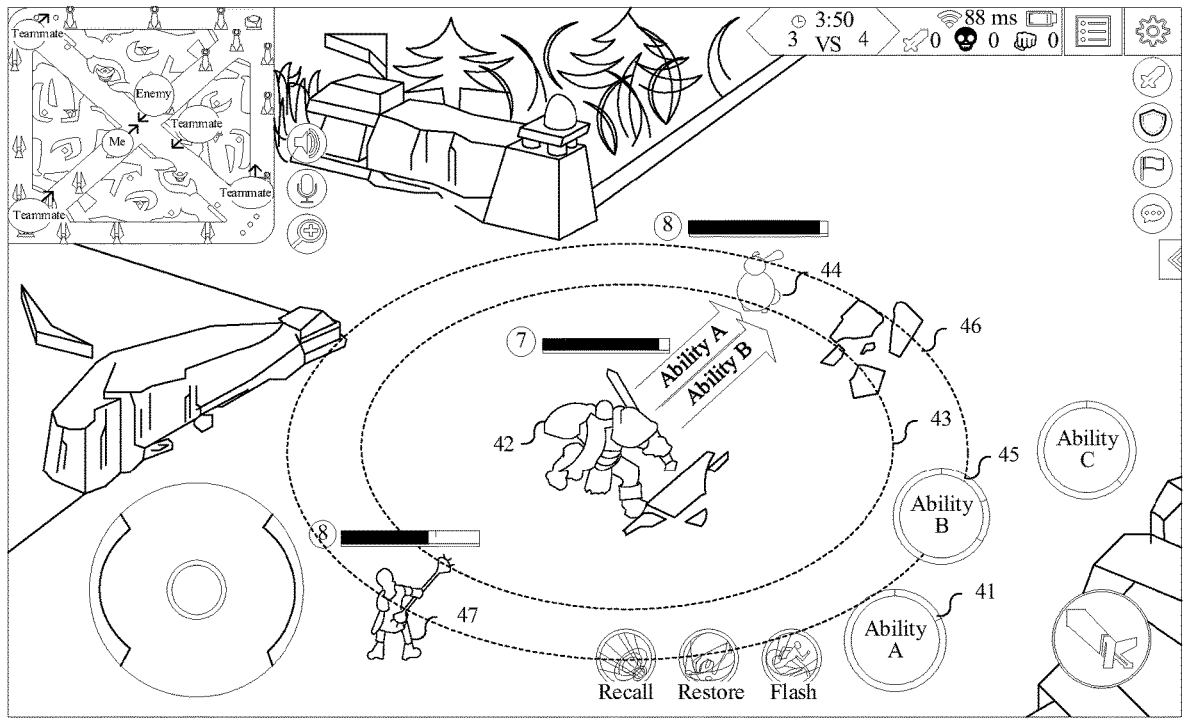
FIG. 4 is a schematic implementation diagram of an ability continuous casting process according to an example embodiment of the disclosure.

For example, as shown in FIG. 4, when a tap operation corresponding to an ability control 41 corresponding to an ability A is received, the terminal controls the first virtual object 42 to cast the ability A on a mage 44 (that is, the target virtual object) in a first ability casting range 43.

Operation 303: Determine the target virtual object as an ability casting target corresponding to a second ability in response to a second trigger operation on a second ability control meeting an ability continuous casting condition, the second trigger operation being triggered during ability casting of the first ability.

In a casting process of the first ability, if a second trigger operation on the second ability control is received, different from that in the related art, the terminal determines an ability casting target (direction or range) of the second ability according to the second trigger operation, an ability casting rule and an ability casting range corresponding to the second ability, and a relative orientation of each second virtual object and the first virtual object.

In an example embodiment of the disclosure, the terminal detects whether the second trigger operation meets the ability continuous casting condition. If the condition to continuous casting is met, the terminal determines the ability casting target corresponding to the second ability as the target virtual object. If the condition to continuous casting is not met, the terminal determines the ability casting target of the second ability according to the method provided in the related art.

In some embodiments, the ability continuous casting condition includes an ability trigger operation condition and an ability casting time condition. Correspondingly, when the second trigger operation meets the ability trigger operation condition and a trigger time corresponding to the second trigger operation meets the ability casting time condition, the second trigger operation is determined to meet the ability continuous casting condition.

Similar to the first ability, the second ability is also an ability having an active casting function.

For example, as shown in FIG. 4, when a tap operation corresponding to an ability control 45 corresponding to an ability B is received in a casting process of the ability A, because the ability continuous casting condition is met, the terminal determines the mage 44 as an ability casting target of the ability B.

Operation 304: Control the first virtual object to cast the second ability on the target virtual object.

Further, the terminal controls the first virtual object to cast the second ability on the target virtual object, so that under an ability continuous casting, and even if the continuously cast abilities correspond to different ability casting ranges, the abilities can be cast on the same virtual object.

For example, as shown in FIG. 4, the terminal controls the first virtual object 42 to cast the ability A and the ability B (the ability A is cast before the ability B) on the mage 44. If the method in the related art is adopted, because a second ability casting range 46 of the ability B is larger than the first ability casting range 43, and a health point of a warrior 47 in the second ability casting range 46 is lower than that of the mage 44, it is determined that the ability casting target of the ability B is the warrior 47, not the mage 44.

In some embodiments, if a third trigger operation on a third ability control (may be different from the first ability control and the second ability control, or may be the first ability control (the first ability has been cast and is in a status that can be cast)) is received in a casting process of the second ability, and the third trigger operation meets the ability continuous casting condition, the terminal further determines the target virtual object as an ability casting target corresponding to a third ability, and controls the first virtual object to cast the third ability. This is not repeated in this embodiment herein.

Based on the above, in this embodiment of the disclosure, when a trigger operation on an ability control is received, if the trigger operation is triggered in an ability casting process of a previous ability and the trigger operation meets an ability continuous casting condition, an ability casting target indicated by the previous ability is determined as an ability casting target indicated by the current ability, so as to control a virtual object to cast an ability on the ability casting target. Through the ability casting target inheritance mechanism, a problem that continuously cast abilities are cast on different objects because different abilities correspond to different ability range can be avoided, and abilities may be cast on the same object continuously in an ability continuous casting scenario, thereby improving accuracy of ability casting.

In an embodiment, to enable the ability casting to meet quick casting requirements of the user and the active aiming requirements, a control region of an ability control is divided into two parts, which are respectively an automatic control region and an active control region. The automatic control region is used for triggering a terminal to automatically determine an ability casting target, direction, or range, and the active control region is used for triggering a user to actively select an ability casting target, direction, or range. Correspondingly, the user may trigger to cast an ability quickly by performing a touch operation on the automatic control region of the ability control, and may actively select an ability casting target by performing a touch operation on the active control region of the ability control, so as to aim actively.

Figure 5:
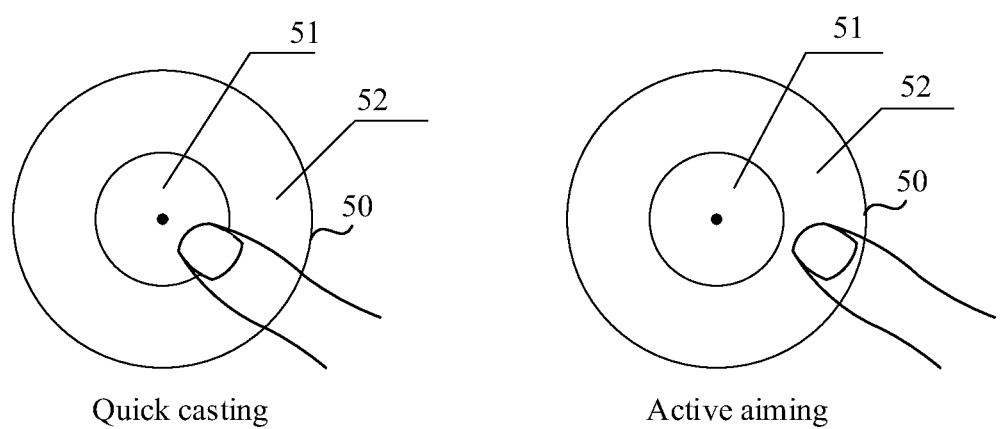
FIG. 5 is a schematic diagram of a control region division manner in an ability control according to an example embodiment of the disclosure.

For example, as shown in FIG. 5, an ability control 50 includes an automatic control region 51 and an active control region 52. The automatic control region 51 is a circular region centered on a center of the ability control 50, and the active control region 52 is a ring region outside the automatic control region 51 and in the ability control 50. When a tap operation (an operation of quickly lifting after touching, as shown on the left side in FIG. 5) on the automatic control region 51 is received, the terminal automatically determines an ability casting target according to an ability casting range and a relative position between another virtual object and a current controlled virtual object, and casts an ability on the ability casting target. When a drag operation (touch and drag, as shown in the right side in FIG. 5) on the active control region 52 is received, the terminal determines an ability casting target (a target actively selected by the user may be marked in a special manner such as highlight) according to a mapping relationship between a touch position in the active control region 52 and a virtual object in a virtual scene, and controls the virtual object to cast an ability on the ability casting target after the drag operation.

The foregoing embodiment is merely used to describe a division manner of an automatic control region and an active control region in an ability control schematically, and the ability control may further adopt other possible control region division manners. This is not limited in this embodiment.

If the second ability control adopts the foregoing control region division manner, to avoid wrongly replacing an ability casting object actively selected by the user by using the second ability control with the ability casting object of the first ability, the terminal needs to determine whether to inherit the ability casting target based on a control region in which the touch operation is located. A schematic embodiment is provided for description.

Figure 6:
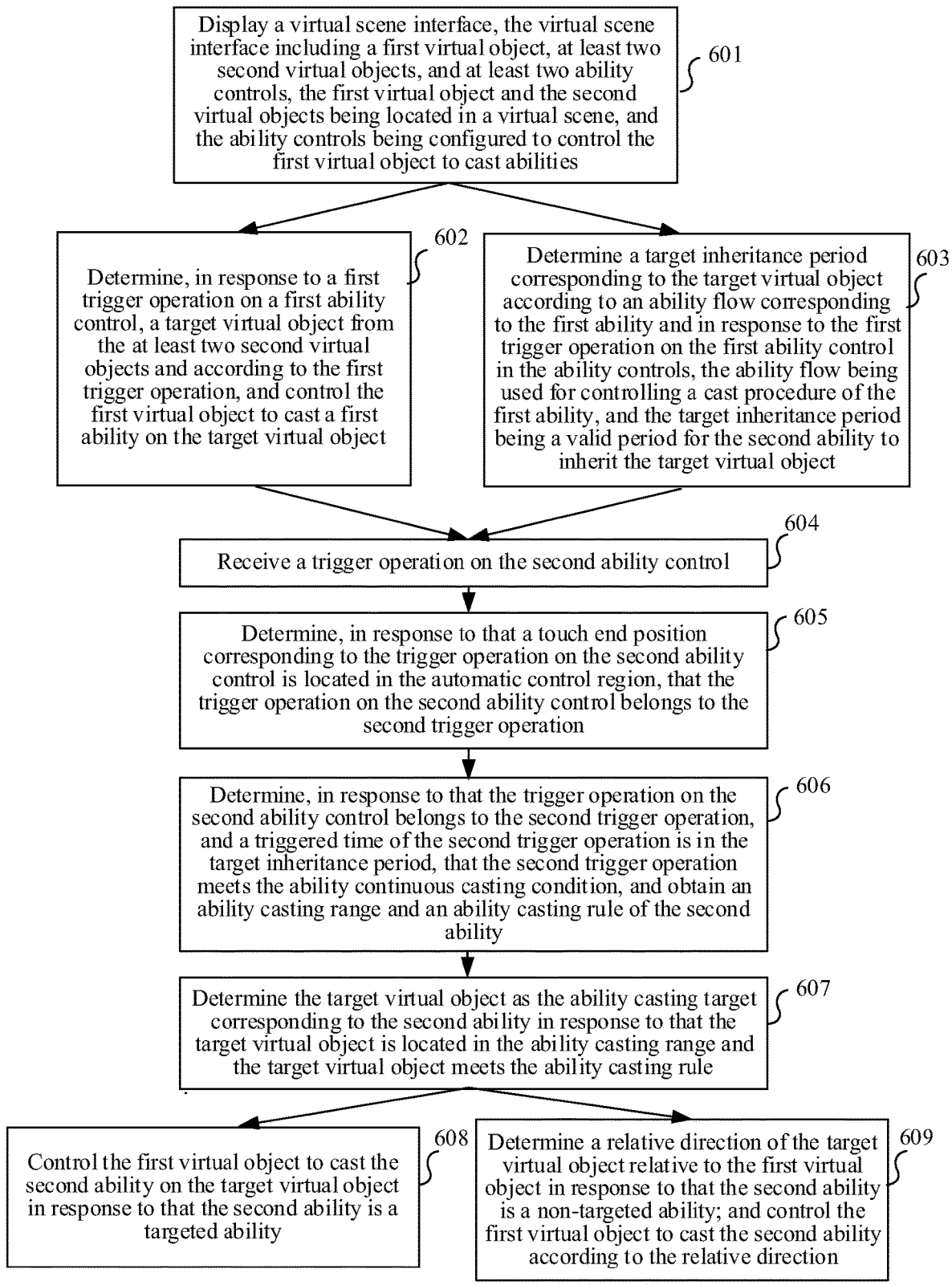
FIG. 6 is a flowchart of a virtual object control method according to another example embodiment of the disclosure.

FIG. 6 is a flowchart of a virtual object control method according to another example embodiment of the disclosure. An example in which the method is used in the first terminal 210 or the second terminal 230 in the implementation environment shown in FIG. 2 or other terminals in the implementation environment is used to describe this embodiment. The method includes the following operations:

Operation 601: Display a virtual scene interface, the virtual scene interface including a first virtual object, at least two second virtual objects, and at least two ability controls, the first virtual object and the second virtual objects being located in a virtual scene, and the ability controls being configured to control the first virtual object to cast abilities.

For the implementation of this operation, reference may be made to operation 301, and details are not described again in this embodiment.

Operation 602: Determine, in response to a first trigger operation on a first ability control, a target virtual object from the at least two second virtual objects and according to the first trigger operation, and control the first virtual object to cast a first ability on the target virtual object.

To inherit the ability casting target subsequently, when controlling the first virtual object to cast the first ability, a specific target virtual object (that is, a specific ability casting target) is required.

In an example embodiment, the first ability control also includes an automatic control region and an active control region. The target virtual object may be specified by a first trigger operation located in the active control region, or may be determined according to a target automatic searching rule of the first ability after the terminal receives a first trigger operation located in the automatic control region.

In an embodiment of the disclosure, the terminal determines the target virtual object according to a target automatic searching rule corresponding to the first ability and in a case that the first ability is a targeted ability or a non-targeted ability and a touch end position of the first trigger operation is located in the automatic control region, and casts the first ability, and determines, in a case that the first ability is a targeted ability and a touch end position of the first trigger operation is located in the active control region, a second virtual object corresponding to the touch end position as the target virtual object, and casts the first ability.

In some embodiments, the target automatic searching rule includes at least one of the following: determining an enemy virtual object with a lowest health point (an absolute health point or a percentage of health point) in an ability casting range as an ability casting target (when the ability is cast on an enemy virtual object); determining a friend virtual object with a lowest health point in an ability casting range as an ability casting target (when the ability is cast on a friend virtual object); and determining an enemy virtual object closest to a current virtual object in an ability casting range as an ability casting object.

When the first ability is a targeted ability and the touch end position of the first trigger operation is located in the automatic control region, the terminal controls the first virtual object to cast the first ability on the target virtual object directionally, which is not shielded or affected by another object between the target virtual object and the first virtual object.

When the first ability is a non-targeted ability and the touch end position of the first trigger operation is located in the automatic control region, the terminal controls, according to a relative direction between the target virtual object and the first virtual object, the first virtual object to cast the first ability according to the relative direction. For example, the first ability (a range-type ability) is cast in the ability casting range of the first ability by using the relative direction as an ability casting center, or the first ability (a ballistic trajectory type ability) is cast according to a relative orientation. When the target virtual object moves during ability casting, or there is another object between the target virtual object and the first virtual object, casting effect of the first ability is affected, and even the target virtual object cannot be hit.

When the first ability is a targeted ability and the touch end position of the first trigger operation is located in the active control region, it represents that the user needs to aim actively. Therefore, the terminal determines the second virtual object corresponding to the touch end position as the target virtual object, and cast the first ability on the target virtual object directionally.

When the first ability is a non-targeted ability and the touch end position of the first trigger operation is located in the active control region, because there may be a plurality of virtual objects in an ability casting direction indicated by the touch end position, the terminal cannot specify the ability casting target. That is, the terminal cannot determine the target virtual object corresponding to the first ability. Correspondingly, even if a second trigger operation meeting the ability continuous casting condition is received subsequently, the ability casting target inheritance mechanism cannot be enabled.

Operation 603: Determine a target inheritance period corresponding to the target virtual object according to an ability flow corresponding to the first ability and in response to the first trigger operation, the ability flow being used for controlling a cast procedure of the first ability, and the target inheritance period being a valid period for the second ability to inherit the target virtual object.

Skill casting is not instantaneous and requires a series of ability procedures, that is, it takes a certain amount of time from the beginning of ability casting to the end of ability casting. The ability flow, that is, a logic layer, is configured to control a control logic of an ability cast procedure. Different abilities correspond to different ability flows.

In an example embodiment, the inheritance for the target virtual object has a valid period, that is, not all second trigger operations on the second ability control received at any time in a casting process of the first ability meet the ability continuous casting condition. Only second trigger operations (that is, there is a requirement on a touch time of the second trigger operation) received in a valid inheritance period in a casting process of the first ability can meet the ability continuous casting condition.

For example, because the valid period is related to the cast procedure of the first ability, the terminal obtains an ability flow corresponding to the first ability from the logic layer after receiving the first trigger operation on the first ability control, further to determine a target inheritance period corresponding to the target virtual object according to a first ability cast procedure indicated by the ability flow. The target inheritance period is a middle and early period of the first ability cast procedure.

In some embodiments, the cast procedure controlled by the ability flow includes an ability casting preparation stage, an ability casting stage, and an ability casting ending stage. The ability casting preparation stage is also referred to as an ability anticipation stage, and in this stage, the virtual object presents an ability casting preparation action. The ability casting ending stage is also referred to as an ability post-shake stage, and in this stage, the virtual object presents an ability casting ending action.

In an example embodiment, if a trigger operation on a current ability is received in an ability casting preparation stage or ability casting stage of a previous ability, it represents that there is an ability continuous casting requirement, so as to determine that an ability continuous casting condition is met. If a trigger operation on a current ability is received in an ability casting ending stage of a previous ability, because the previous ability has been cast (additional effects may not be cast to the ability casting target in the ability casting ending stage), there is no ability continuous casting requirement, so as to determine that the ability continuous casting condition is not met. The process of determining a target inheritance period corresponding to the target virtual object according to the ability flow may include the following steps:

1. Determine a duration of the target inheritance period according to a first duration of the ability casting preparation stage and a second duration of the ability casting stage.

In an example embodiment, the terminal determines a trigger operation whose triggered time is in an ability casting preparation stage or ability casting stage corresponding to a previous ability as a trigger operation meeting the ability continuous casting condition. Correspondingly, after obtaining an ability flow of the first ability, the terminal obtains a first duration of the ability casting preparation stage and a second duration of an ability casting stage, further to determine a sum of the first duration and the second duration as the duration of the target inheritance period.

For example, in the ability flow corresponding to the first ability, if the first duration of the ability casting preparation stage is 100 ms, and the second duration of the ability casting stage is 125 ms, then the terminal determines the duration of a target inheritance period as 225 ms.

In an example embodiment, the terminal may alternatively determine a duration shorter than the sum of the first duration and the second duration as the duration of the target inheritance period. This is not limited in this embodiment.

Different abilities correspond to different durations of an ability casting preparation stage and ability casting stage, thus different abilities correspond to different durations of a target inheritance period.

2. Determine the target inheritance period according to a start execution time and the duration of the ability flow.

Further, the terminal determines a start time of the target inheritance period and an end time according to a start execution time of the ability flow and a duration of the target inheritance period. The start time is the start execution time of the ability flow, and the end time is determined according to the duration and the start time.

Figure 7:
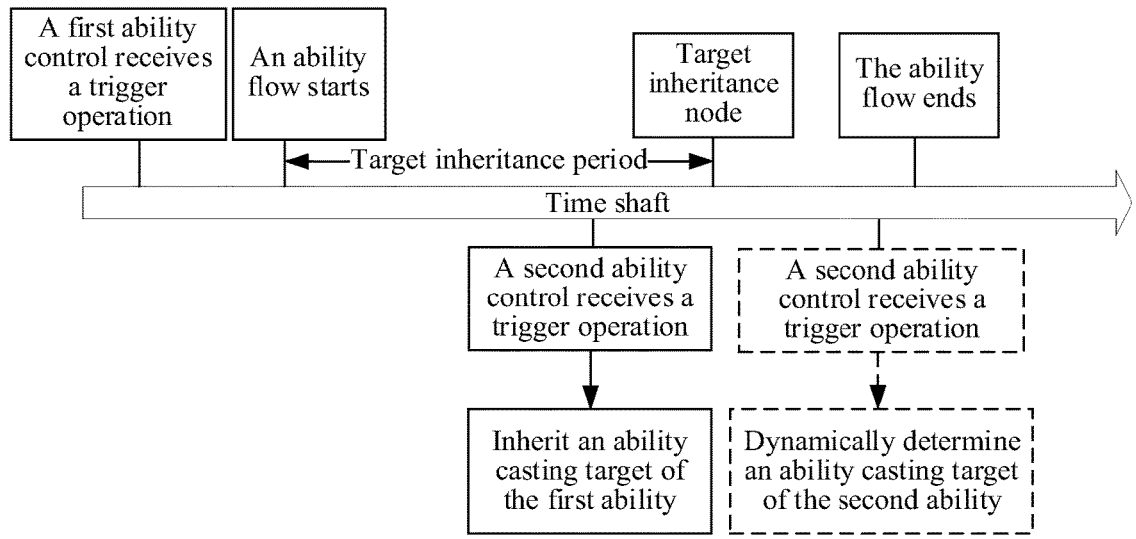
FIG. 7 is a diagram of a principle of an ability casting target inheritance mechanism according to an example embodiment of the disclosure.

In an example embodiment, as shown in FIG. 7, when a trigger operation on the first ability control is received, the terminal performs an ability flow corresponding to the first ability, and sets a target inheritance node between the beginning and the end of the ability flow, and a time between the beginning of the ability flow and the target inheritance node may be used as the target inheritance period.

There is no strict sequence between operation 602 and operation 603. The terminal may perform operation 602 and operation 603 synchronously after the first trigger operation is received. This is not limited in this embodiment.

Operation 604: Receive a trigger operation on the second ability control.

In a casting process of the first ability, the terminal receives a trigger operation on the second ability control.

Operation 605: Determine, in response to a touch end position corresponding to the trigger operation on the second ability control being located in the automatic control region, that the trigger operation on the second ability control belongs to the second trigger operation.

In order to avoid the failure of active aiming caused by enabling the ability casting target inheritance mechanism, the user may select an ability casting target by using an active aiming function provided by the second ability control. In this embodiment, the terminal obtains a touch end position corresponding to a trigger operation, and determines that the trigger operation belongs to the second trigger operation when the touch end position is located in the automatic control region (it represents that the user does not aim actively, that is, the user does not specify an ability casting target), that is, the trigger operation meets a trigger operation condition in the ability continuous casting condition.

For example, as shown in FIG. 5, when the touch end position is located in the automatic control region 51, the terminal determines that a trigger operation on the ability control 50 meets the trigger operation condition in the ability continuous casting condition.

Operation 606: Determine, in response to the trigger operation on the second ability control belonging to the second trigger operation, and a triggered time of the second trigger operation is in the target inheritance period, that the second trigger operation meets the ability continuous casting condition, and obtain an ability casting range and an ability casting rule of the second ability.

Further, when the trigger operation condition is met, the terminal further detects whether the triggered time of the second trigger operation is in the target inheritance period, determines that the second trigger operation meets a triggered time condition if the triggered time of the second trigger operation is in the target inheritance period, and further determines that the second trigger operation meets the ability continuous casting condition.

Figure 8:
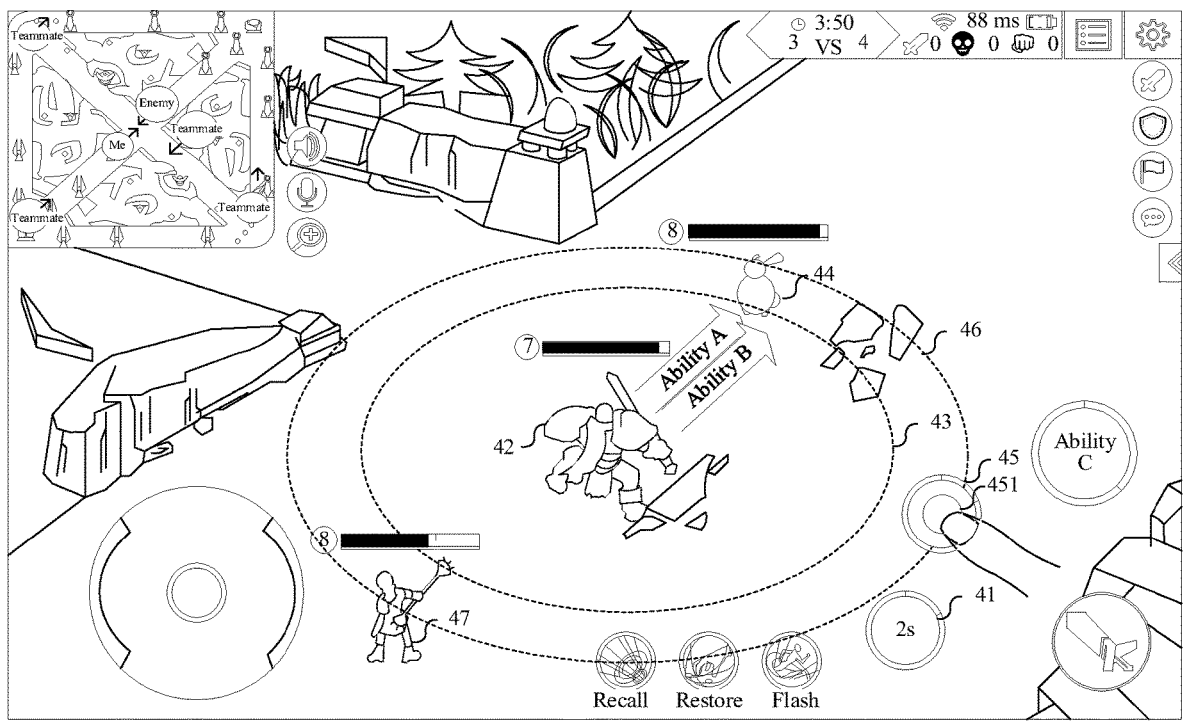
FIG. 8 is a schematic diagram of an interface of controlling a virtual object to cast an ability according to an example embodiment of the disclosure.

For example, as shown in FIG. 8, the user first taps a first ability control 41, and controls the first virtual object 42 to cast an ability A to the mage 44. When the ability A is in a cooling state, the user quickly taps an automatic control region 451 of a second ability control 45. Because a time for tapping the second ability control 45 belongs to the target inheritance period, the terminal determines the mage 44 as the ability casting target of an ability B.

For example, the terminal determines an ability casting target (may be the same as or different from the target virtual object) of a second ability from at least two second virtual objects according to the second trigger operation and an ability casting rule and an ability casting range of the second ability, in response to the trigger operation on the second ability control not belonging to the second trigger operation, or the triggered time of the second trigger operation being outside the target inheritance period.

Because different abilities have different ability casting ranges and ability casting rules, if the inherited target virtual object does not meet the ability casting range or the ability casting rule of the second ability, invalid ability casting may occur. Therefore, in some embodiments, when the second trigger operation meets the ability continuous casting condition, the terminal further obtains the ability casting range and the ability casting rule of the second ability, and detects whether the target virtual object meets the ability casting range and the ability casting rule.

For example, the ability casting rule includes a casting target rule. The casting target rule indicates that: only can be cast on a friend virtual object, only can be cast on an enemy virtual object, only can be cast on an enemy hero, or only can be cast on an enemy virtual object in a predetermined duration.

In an example embodiment, the terminal obtains position information of the target virtual object in the virtual scene and attribute information of the target virtual object, so as to detect whether the target virtual object is in the ability casting range of the second ability according to the position information and detect whether the target virtual object meets the ability casting rule according to the attribute information.

The attribute information may include at least one of the following: a camp to which the virtual object belongs, a health point, an energy value, and an ability cast in a predetermined duration.

Operation 607: Determine the target virtual object as the ability casting target corresponding to the second ability in response to the target virtual object being located in the ability casting range and the target virtual object meeting the ability casting rule.

When the target virtual object is located in the ability casting range and the target virtual object meets the ability casting rule, the terminal determines that the second ability can be cast on the target virtual object, so as to determine an ability casting target corresponding to the second ability is the target virtual object.

For example, as shown in FIG. 7, when the trigger operation on the second ability control is received in the target inheritance period, the second ability inherits the ability casting target of the first ability. If the trigger operation on the second ability control is received outside the target inheritance period, the terminal dynamically determines the ability casting target of the second ability according to the ability casting range and the ability casting rule of the second ability.

In an example embodiment, if the target virtual object is located outside the ability casting range, and/or, the target virtual object does not meet the ability casting rule, the terminal determines that the second virtual object belongs to the ability casting target of the second ability determined according to the ability casting range and the ability casting rule of the second ability.

In some embodiments, since continuously cast abilities are usually a combined ability, to further improve the accuracy of ability casting, when an ability casting combination formed by the first ability and the second ability belongs to an ability combination list of the first virtual object, the terminal determines the target virtual object as the ability casting target corresponding to the second ability. The ability combination list includes at least one ability casting combination corresponding to the first virtual object, and the ability casting combination includes at least two abilities and a casting sequence between the abilities.

In an example embodiment, the terminal stores ability combination lists corresponding to different virtual objects, and each ability combination in the ability combination list is formed by at least two abilities, and there is a specified ability casting sequence. For example, an ability combination list may be shown as Table 1:

TABLE 1

| Ability combination | First ability | Second ability |
|---|---|---|
| 1 | Ability A | Ability B |
| 2 | Ability B | Ability C |

The ability combination 1 includes an ability A and an ability B where the ability A is cast before the ability B. The ability combination 2 includes an ability B and an ability C where the ability B is cast before the ability C.

When the first ability and the second ability belong to an ability combination in the ability combination list, and an ability sequence meets an ability casting sequence in the ability combination, it is determined that an ability casting combination formed by the first ability and the second ability belongs to the ability combination list.

For example, when trigger operations on the ability A and the ability B are received consecutively, because the ability A and the ability B belong to the ability combination 1, and a sequence for receiving the trigger operations meets the ability casting sequence of the ability combination, the terminal determines an ability casting target of the ability A as an ability casting target of the ability B. If trigger operations on the ability A and the ability C are received consecutively, because an ability casting combination formed by the ability A and the ability C does not belong to the ability combination list, the ability C cannot inherit the ability casting target of the ability A directly.

Operation 608: Control the first virtual object to cast the second ability on the target virtual object in response to the second ability being a targeted ability.

For different types of second abilities, manners for controlling the first virtual object to cast the second abilities after the ability casting target is inherited may also be different.

For example, when the second ability is a targeted ability (the targeted ability is an ability with a specified ability casting target), the terminal controls the first virtual object to cast the second ability on the target virtual object directly. No matter whether the target virtual object moves or whether there is another object between the target virtual object and the first virtual object, the second ability can affect the target virtual object directly. For example, the second ability is a targeted damage ability, and the second ability is to change a health point of the target virtual object targeted.

Operation 609: Determine a relative direction of the target virtual object relative to the first virtual object in response to the second ability being a non-targeted ability; and control the first virtual object to cast the second ability according to the relative direction.

For example, when the second ability is a non-targeted ability, the terminal controls, according to a relative direction of a current position of the target virtual object and the first virtual object, the first virtual object to cast the second ability according to the relative direction.

When the target virtual object is displaced in a casting process of the second ability, or there is another virtual object between the target virtual object and the first virtual object, the second ability may not hit the target virtual object or the ability effect of the second ability may be affected.

Figure 9:
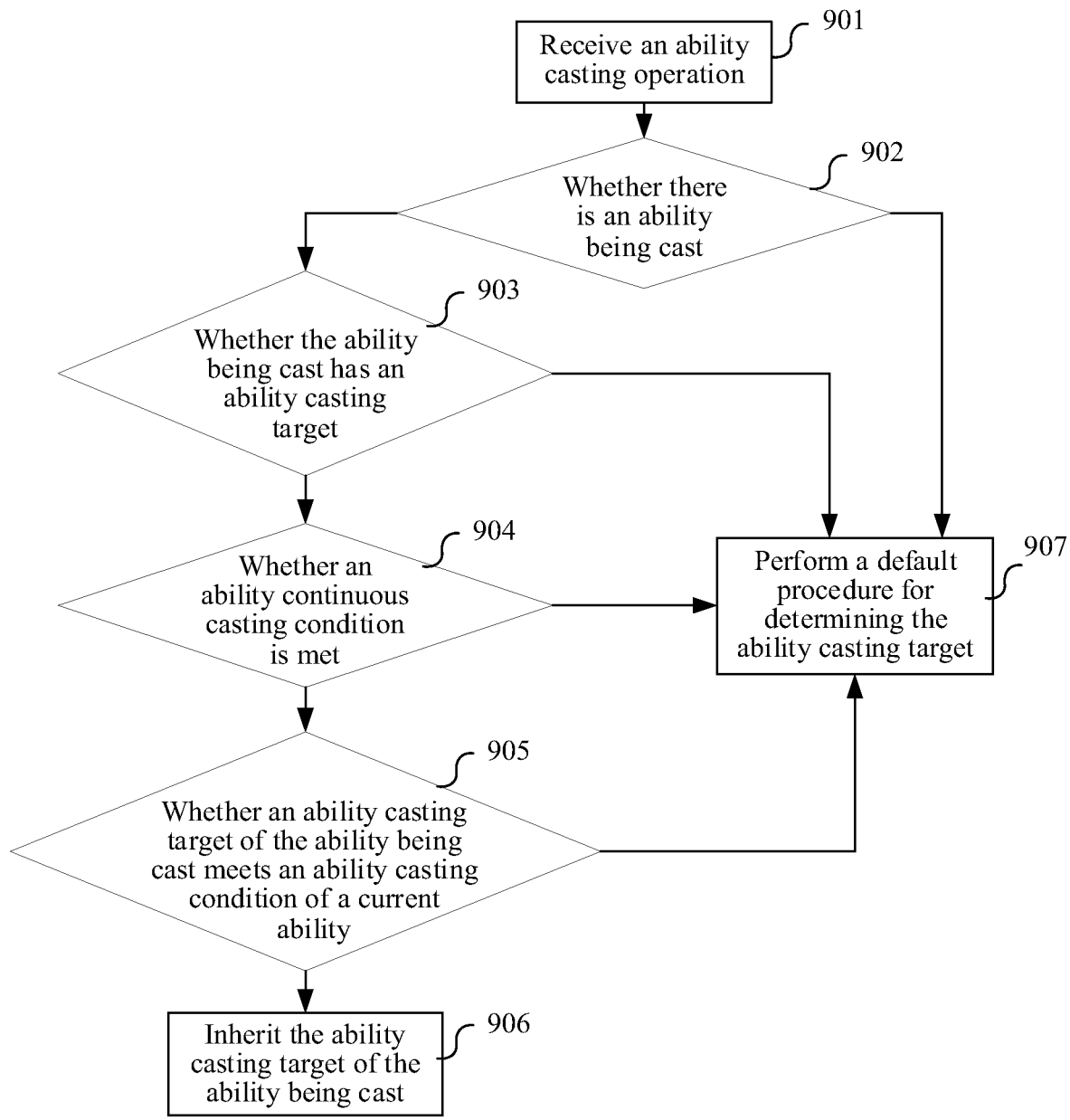
FIG. 9 is a flowchart of a virtual object control method according to another example embodiment of the disclosure.

In an example embodiment, the virtual object control method shown in FIG. 9 is applied in the first terminal 210 or the second terminal 230 in the implementation environment or another terminal in the implementation environment shown in FIG. 2. When a trigger operation on an ability control is received, an ability casting target is determined by using the following operations:

Operation 901: Receive an ability casting operation.

Operation 902: Detect whether there is an ability being cast. Operation 903 is performed if there is an ability being cast, and operation 907 is performed if there is not an ability being cast.

Operation 903: Detect whether the ability being cast has an ability casting target. Operation 904 is performed if the ability being cast has an ability casting target, and operation 907 is performed if the ability being cast does not have an ability casting target.

Operation 904: Detect whether a second trigger operation meets an ability continuous casting condition. Operation 905 is performed if the second trigger operation meets the ability continuous casting condition, and operation 907 is performed if the second trigger operation does not meet an ability continuous casting condition.

Operation 905: Detect whether an ability casting target of the ability being cast meets an ability casting condition of a current ability. Operation 906 is performed if the ability casting target of the ability being cast meets the ability casting condition of the current ability, and operation 907 is performed if the ability casting target of the ability being cast does not meet the ability casting condition of the current ability.

Operation 906: Inherit the ability casting target of the ability being cast.

Operation 907: Perform a default procedure for determining the ability casting target.

In conclusion, in this embodiment, for a second ability control having an automatic control region and an active control region, only when a trigger operation on the second ability control is located in the automatic control region, the terminal enables an ability casting object inheritance mechanism, thereby avoiding affecting an active aiming operation of the user, and further improving accuracy of continuous ability casting.

In addition, in this embodiment, the terminal determines a valid inheritance period of an ability casting target according to durations of an ability casting preparation stage and an ability casting stage in an ability flow, and enables an ability casting object inheritance mechanism when a triggered time of the trigger operation on the second ability control is within an ability valid period, to avoid a problem that an ability casting target of a current ability is still an ability casting target of a previous cast ability, thereby improving accuracy of continuous ability casting.

In addition, in this embodiment, the terminal determines whether to inherit an ability casting target by detecting whether a continuously cast ability belongs to an ability combination, which helps improve accuracy of ability combination casting.

Figure 10:
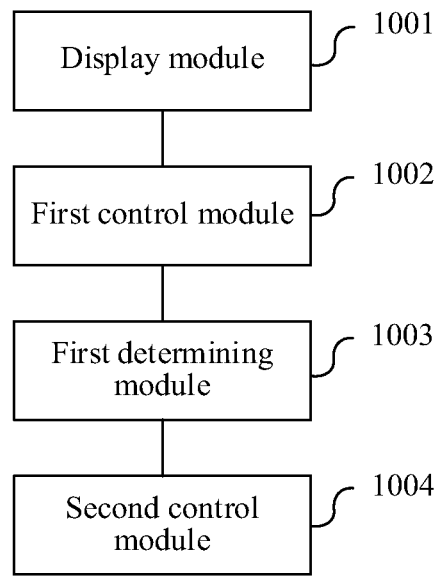
FIG. 10 is a structural block diagram of a virtual object control apparatus according to an example embodiment of the disclosure.

FIG. 10 is a structural block diagram of a virtual object control apparatus according to an example embodiment of the disclosure. The apparatus may include:

a display module 1001, configured to display a virtual scene interface, the virtual scene interface including a first virtual object, at least two second virtual objects, and at least two ability controls, the first virtual object and the second virtual objects being located in a virtual scene, and the ability controls being configured to control the first virtual object to cast abilities;

a first control module 1002, configured to determine, in response to a first trigger operation on a first ability control, a target virtual object from the at least two second virtual objects and according to the first trigger operation, and control the first virtual object to cast a first ability on the target virtual object;

a first determining module 1003, configured to determine the target virtual object as an ability casting target corresponding to a second ability in response to a second trigger operation on a second ability control meeting an ability continuous casting condition, the second trigger operation being triggered during ability casting of the first ability; and a second control module 1004, configured to control the first virtual object to cast the second ability on the target virtual object.

The Apparatus May Further Include:

an inheritance period determining module, configured to determine a target inheritance period corresponding to the target virtual object according to an ability flow corresponding to the first ability and in response to the first trigger operation on the first ability control, the ability flow being used for controlling a cast procedure of the first ability, and the target inheritance period being a valid period for the second ability to inherit the target virtual object.

In an example embodiment, the first determining module 1003 includes:

an operation receiving unit, configured to receive a trigger operation on the second ability control; and a determining unit, configured to determine, in response to the trigger operation on the second ability control belonging to the second trigger operation, and a triggered time of the second trigger operation is in the target inheritance period, that the second trigger operation meets the ability continuous casting condition, and determine the target virtual object as the ability casting target corresponding to the second ability.

For example, the cast procedure controlled by the ability flow includes an ability casting preparation stage, an ability casting stage, and an ability casting ending stage.

In an example embodiment, the inheritance period determining module is configured to:

determine a duration of the target inheritance period according to a first duration of the ability casting preparation stage and a second duration of the ability casting stage; and determine the target inheritance period according to a start execution time and the duration of the ability flow.

For example, the second ability control includes an automatic control region and an active control region, the automatic control region is used for triggering a terminal to determine an ability casting target, direction, or range, and the active control region is used for triggering a user to select an ability casting target, direction, or range.

In an example embodiment, the apparatus includes:

an operation determining module, configured to determine, in response to a touch end position corresponding to the trigger operation on the second ability control being located in the automatic control region, that the trigger operation on the second ability control belongs to the second trigger operation.

In an example embodiment, the first determining module 1003 further includes:

a rule obtaining unit, configured to obtain an ability casting range and an ability casting rule of the second ability.

In an example embodiment, the determining unit may be further configured to determine the target virtual object as the ability casting target corresponding to the second ability in response to the target virtual object being located in the ability casting range and the target virtual object meeting the ability casting rule.

In an example embodiment, the first determining module 1003 is configured to:

determine the target virtual object as the ability casting target corresponding to the second ability in response to the target virtual object being located in the ability casting range, the target virtual object meeting the ability casting rule, and an ability casting combination formed by the first ability and the second ability belonging to an ability combination list of the first virtual object, the ability combination list including at least one ability casting combination corresponding to the first virtual object, and the ability casting combination including at least two abilities and a casting sequence between the abilities.

In an example embodiment, the apparatus further includes:

a second determining module, configured to determine the ability casting target of the second ability from the at least two second virtual objects according to the second trigger operation and an ability casting rule and an ability casting range of the second ability in response to the trigger operation on the second ability control not belonging to the second trigger operation, or, the triggered time of the second trigger operation being outside the target inheritance period.

In an example embodiment, the second control module 1004 is configured to:

control the first virtual object to cast the second ability on the target virtual object in response to the second ability being a targeted ability, the targeted ability being an ability with a specified ability casting target; and determine a relative direction of the target virtual object relative to the first virtual object in response to the second ability being a non-targeted ability; and control the first virtual object to cast the second ability according to the relative direction.

For example, the first ability control includes an automatic control region and an active control region, the automatic control region is used for triggering a terminal to determine an ability casting target, direction, or range, and the active control region is used for triggering a user to select an ability casting target, direction, or range.

In an example embodiment, the first control module 1002 is configured to:

determine the target virtual object according to a target automatic searching rule corresponding to the first ability and in response to the first ability being a targeted ability or a non-targeted ability and a touch end position of the first trigger operation is located in the automatic control region, and cast the first ability; and determine a second virtual object corresponding to the touch end position as the target virtual object in response to the first ability being a targeted ability and a touch end position of the first trigger operation being located in the active control region, and cast the first ability.

Based on the above, in this example embodiment of the disclosure, when a trigger operation on an ability control is received, if the trigger operation is triggered in an ability casting process of a previous ability and the trigger operation meets an ability continuous casting condition, an ability casting target indicated by the previous ability is determined as an ability casting target indicated by the current ability, so as to control a virtual object to cast an ability on the ability casting target. Through the ability casting target inheritance mechanism, a problem that continuously cast abilities are cast on different objects because different abilities correspond to different ability range can be avoided, and abilities may be cast on the same object continuously in an ability continuous casting scenario, thereby improving accuracy of ability casting.

A person skilled in the art would understand that these "units/modules" could be implemented by hardware logic, computer software code, or a combination of both.

Figure 11:
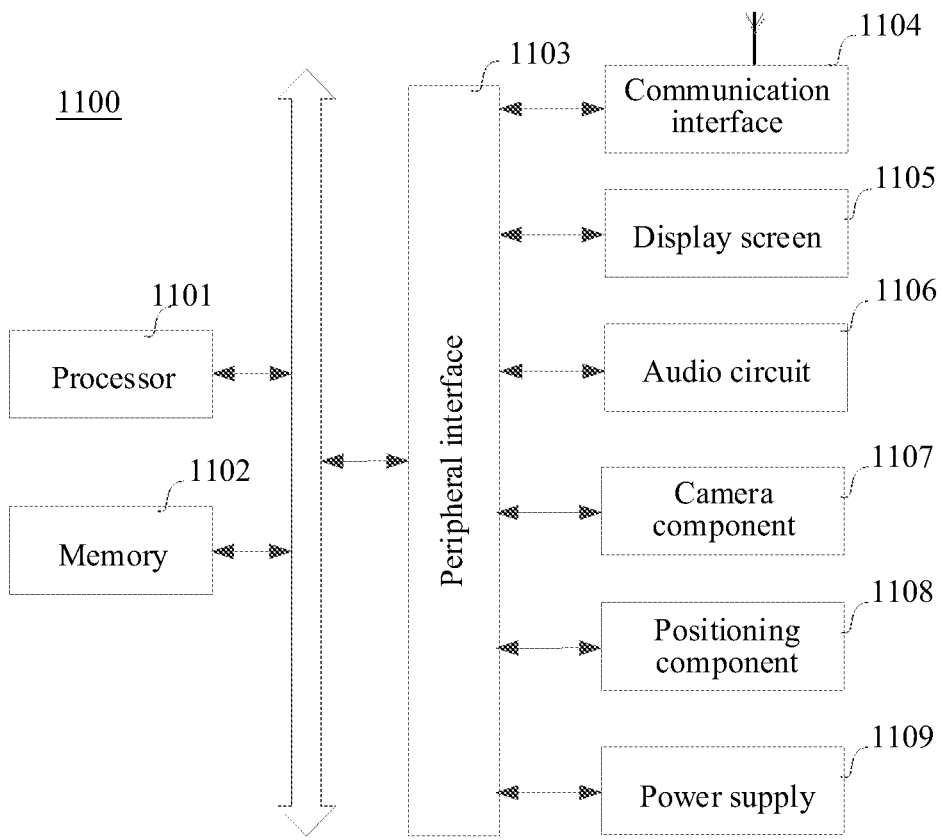
FIG. 11 is a structural block diagram of a terminal according to an example embodiment of the disclosure.

FIG. 11 is a structural block diagram of a terminal according to an embodiment of the disclosure. Generally, a terminal 1100 includes a processor 1101 and a memory 1102.

The processor 1101 may include one or more processing cores. For example, the processor may be a 4-core processor or an 8-core processor. The processor 1101 may be implemented by using at least one hardware form of a digital signal processor (DSP), a field-programmable gate array (FPGA), and a programmable logic array (PLA). The processor 1101 may alternatively include a main processor and a coprocessor. The main processor is configured to process data in an active state, also referred to as a central processing unit (CPU). The coprocessor is a low-power processor configured to process data in a standby state. In some embodiments, the processor 1101 may be integrated with a graphics processing unit (GPU). The GPU is configured to render and draw content that needs to be displayed on a display screen. In some embodiments, the processor 1101 may further include an artificial intelligence (AI) processor. The AI processor is configured to process a computing operation related to machine learning.

The memory 1102 may include one or more computer-readable storage media. The computer-readable storage medium may be non-transient. The memory 1102 may further include a high-speed random access memory, and a non-volatile memory such as one or more magnetic disk storage devices and a flash memory device. In some embodiments, a non-transitory computer-readable storage medium in the memory 1102 is configured to store at least one instruction, at least one program, a code set, or an instruction set, the at least one instruction, the at least one program, the code set, or the instruction set being configured to be executed by the processor 1101 to implement the method provided in the method embodiments of the disclosure.

In some embodiments, the terminal 1100 may include a peripheral interface 1103 and at least one peripheral. The processor 1101, the memory 1102, and the peripheral interface 1103 may be connected through a bus or a signal cable. Each peripheral may be connected to the peripheral interface 1103 through a bus, a signal cable, or a circuit board. Specifically, the peripheral may include at least one of a communication interface 1104, a display screen 1105, an audio circuit 1106, a camera component 1107, a positioning component 1108, and a power supply 1109.

A person skilled in the art may understand that the structure shown in FIG. 11 constitutes no limitation on the terminal 1100, and the terminal may include more or fewer components than those shown in the figure, or some components may be combined, or a different component deployment may be used.

An embodiment of the disclosure further provides a computer-readable storage medium, storing at least one instruction, the at least one instruction being loaded and executed by a processor to implement the virtual object control method according to the foregoing embodiments.

An embodiment of the disclosure further provides a computer program product, storing at least one instruction, the at least one instruction being loaded and executed by a processor to implement the virtual object control method according to the foregoing embodiments.

A person skilled in the art should be aware of that in the one or more examples, the functions described in the embodiments of the disclosure may be implemented by hardware, software, firmware, or a combination of the above. When implemented by using software, the functions can be stored in a computer-readable storage medium or can be used as one or more instructions or code in a computer-readable storage medium for transferring. The computer-readable storage medium includes a computer storage medium and a communication medium, where the communication medium includes any medium that enables a computer program to be transmitted from one place to another. The storage medium may be any available medium accessible to a general-purpose or dedicated computer.

The foregoing descriptions are merely embodiments of the disclosure, but are not intended to limit the disclosure. Any modification, equivalent replacement, or improvement made within the spirit and principle of the disclosure shall fall within the protection scope of the disclosure.

What is claimed is:

1. A virtual object control method, performed by a terminal, the method comprising:
    displaying a virtual scene interface, the virtual scene interface comprising a first virtual object, at least two second virtual objects, and at least two ability controls, the first virtual object and the second virtual objects being located in a virtual scene, and the ability controls being configured to control the first virtual object to cast abilities;
    determining, in response to a first trigger operation on a first ability control, a target virtual object from the at least two second virtual objects and according to the first trigger operation, and controlling the first virtual object to cast a first ability on the target virtual object;
    determining the target virtual object as an ability casting target corresponding to a second ability in response to a second trigger operation on a second ability control meeting an ability continuous casting condition, the second trigger operation being triggered during ability casting of the first ability; and
    controlling the first virtual object to cast the second ability on the target virtual object.

2. The method according to claim 1, further comprising:
    determining a target inheritance period corresponding to the target virtual object according to an ability flow corresponding to the first ability and in response to the first trigger operation, the ability flow being used for controlling a cast procedure of the first ability, and the target inheritance period being a valid period for the second ability to inherit the target virtual object; and
    the determining the target virtual object as an ability casting target corresponding to a second ability in response to a second trigger operation on a second ability control meeting an ability continuous casting condition comprises:
    receiving a trigger operation on the second ability control; and
    determining, in response to the trigger operation on the second ability control belonging to the second trigger operation and a triggered time of the second trigger operation being in the target inheritance period, that the second trigger operation meets the ability continuous casting condition, and determining the target virtual object as the ability casting target corresponding to the second ability.

3. The method according to claim 2, wherein the cast procedure controlled by the ability flow comprises an ability casting preparation stage, an ability casting stage, and an ability casting ending stage; and
    the determining a target inheritance period corresponding to the target virtual object according to an ability flow corresponding to the first ability comprises:
    determining a duration of the target inheritance period according to a first duration of the ability casting preparation stage and a second duration of the ability casting stage; and
    determining the target inheritance period according to a start execution time and the duration of the ability flow.

4. The method according to claim 2, wherein the second ability control comprises an automatic control region and an active control region, the automatic control region being used for triggering a terminal to determine an ability casting target, direction, or range, and the active control region being used for triggering a user to select an ability casting target, direction, or range; and
    after receiving the trigger operation on the second ability control, the method further comprises:
    determining, in response to a touch end position corresponding to the trigger operation on the second ability control being located in the automatic control region, that the trigger operation on the second ability control belongs to the second trigger operation.

5. The method according to claim 2, wherein the determining the target virtual object as an ability casting target corresponding to a second ability comprises:
    obtaining an ability casting range and an ability casting rule of the second ability; and
    determining the target virtual object as the ability casting target corresponding to the second ability in response to the target virtual object being located in the ability casting range and the target virtual object meeting the ability casting rule.

6. The method according to claim 5, wherein the determining the target virtual object as the ability casting target corresponding to the second ability in response to the target virtual object being located in the ability casting range and the target virtual object meets the ability casting rule comprises:
    determining the target virtual object as the ability casting target corresponding to the second ability in response to the target virtual object being located in the ability casting range, the target virtual object meeting the ability casting rule, and an ability casting combination formed by the first ability and the second ability belonging to an ability combination list of the first virtual object, the ability combination list comprising at least one ability casting combination corresponding to the first virtual object, and the ability casting combination comprising at least two abilities and a casting sequence between the abilities.

7. The method according claim 4, further comprising:
    determining the ability casting target of the second ability from the at least two second virtual objects according to the second trigger operation and an ability casting rule and an ability casting range of the second ability in response to the trigger operation on the second ability control not belonging to the second trigger operation.

8. The method according to claim 4, further comprising:
determining the ability casting target of the second ability from the at least two second virtual objects according to the second trigger operation and an ability casting rule and an ability casting range of the second ability in response to the triggered time of the second trigger operation being outside the target inheritance period.

9. The method according claim 1, wherein the controlling comprises:
controlling the first virtual object to cast the second ability on the target virtual object in response to the second ability being a targeted ability, the targeted ability being an ability with a specified ability casting target.

10. The method according to claim 1, wherein the controlling comprises:
determining a relative direction of the target virtual object relative to the first virtual object in response to the second ability being a non-targeted ability; and controlling the first virtual object to cast the second ability according to the relative direction.

11. The method according to claim 1, wherein the first ability control comprises an automatic control region and an active control region, the automatic control region being used for triggering a terminal to determine an ability casting target, direction, or range, and the active control region being used for triggering a user to select an ability casting target, direction, or range; and
the controlling the first virtual object to cast a first ability on the target virtual object comprises:
determining the target virtual object according to a target automatic searching rule corresponding to the first ability and in response to the first ability being a targeted ability or a non-targeted ability and a touch end position of the first trigger operation being located in the automatic control region, and casting the first ability.

12. The method according to claim 1, wherein the first ability control comprises an automatic control region and an active control region, the automatic control region being used for triggering a terminal to determine an ability casting target, direction, or range, and the active control region being used for triggering a user to select an ability casting target, direction, or range; and
the controlling the first virtual object to cast a first ability on the target virtual object comprises:
determining a second virtual object corresponding to the touch end position as the target virtual object in response to the first ability being a targeted ability and a touch end position of the first trigger operation being located in the active control region, and casting the first ability.

13. A virtual object control apparatus, comprising:
a display screen;
at least one memory configured to store computer program code;
at least one processor configured to operate as instructed by the computer program code, the computer program code including:
display code configured to cause the at least one processor to display on the display screen, a virtual scene interface, the virtual scene interface comprising a first virtual object, at least two second virtual objects, and at least two ability controls, the first virtual object and the second virtual objects being located in a virtual scene, and the ability controls being configured to control the first virtual object to cast abilities;
first control code configured to cause the at least one processor to: determine, in response to a first trigger operation on a first ability control, a target virtual object from the at least two second virtual objects and according to the first trigger operation, and control the first virtual object to cast a first ability on the target virtual object;
first determining code configured to cause the at least one processor to determine the target virtual object as an ability casting target corresponding to a second ability in response to a second trigger operation on a second ability control meeting an ability continuous casting condition, the second trigger operation being triggered during ability casting of the first ability; and
second control code configured to cause the at least one processor to control the first virtual object to cast the second ability on the target virtual object.

14. A terminal, comprising a processor and a memory, the memory storing at least one instruction, at least one program, a code set, or an instruction set, the at least one instruction, the at least one program, the code set, or the instruction set being loaded and executed by the processor to implement the virtual object control method according to claim 1.

15. The apparatus according to claim 13, wherein the computer program code further includes:
second determining code configured to cause the at least one processor to determine a target inheritance period corresponding to the target virtual object according to an ability flow corresponding to the first ability and in response to the first trigger operation, the ability flow being used for controlling a cast procedure of the first ability, and the target inheritance period being a valid period for the second ability to inherit the target virtual object; and
the first determine code further comprises:
receiving code configured to cause the at least one processor to receive a trigger operation on the second ability control; and
third determining code configured to cause the at least one processor to determine, in response to the trigger operation on the second ability control belonging to the second trigger operation and a triggered time of the second trigger operation being in the target inheritance period, that the second trigger operation meets the ability continuous casting condition, and determining the target virtual object as the ability casting target corresponding to the second ability.

16. The apparatus according to claim 15, wherein the cast procedure comprises an ability casting preparation stage, an ability casting stage, and an ability casting ending stage; and
the second determining code further comprises:
fourth determining code configured to cause the at least one processor to determine a duration of the target inheritance period according to a first duration of the ability casting preparation stage and a second duration of the ability casting stage; and
fifth determining code configured to cause the at least one processor to determine the target inheritance period according to a start execution time and the duration of the ability flow.

17. The apparatus according to claim 13, wherein the second ability control comprises an automatic control region and an active control region, the automatic control region being used for triggering a terminal to determine an ability casting target, direction, or range, and the active control region being used for triggering a user to select an ability casting target, direction, or range; and after receiving the trigger operation on the second ability control, the apparatus further comprises:

determining, in response to a touch end position corresponding to the trigger operation on the second ability control being located in the automatic control region, that the trigger operation on the second ability control belongs to the second trigger operation.

18. The apparatus according to claim 15, wherein the first determining code further comprises:

first obtaining code configured to cause the at least on processor to obtain an ability casting range and an ability casting rule of the second ability; and sixth determining code configured to cause the at least one processor to determine the target virtual object as the ability casting target corresponding to the second ability in response to the target virtual object being located in the ability casting range and the target virtual object meets the ability casting rule.

19. The apparatus according to claim 18, wherein the sixth determining code is further configured to cause the at least one processor to:

determine the target virtual object as the ability casting target corresponding to the second ability in response to the target virtual object being located in the ability casting range, the target virtual object meets the ability casting rule, and an ability casting combination formed by the first ability and the second ability belongs to an ability combination list of the first virtual object, the ability combination list comprising at least one ability casting combination corresponding to the first virtual object, and the ability casting combination comprising at least two abilities and a casting sequence between the abilities.

20. A non-volatile computer readable memory storage medium, storing computer code that when executed by at least one processor causes the at least one processor to:

display a virtual scene interface, the virtual scene interface comprising a first virtual object, at least two second virtual objects, and at least two ability controls, the first virtual object and the second virtual objects being located in a virtual scene, and the ability controls being configured to control the first virtual object to cast abilities;

determine, in response to a first trigger operation on a first ability control, a target virtual object from the at least two second virtual objects and according to the first trigger operation, and controlling the first virtual object to cast a first ability on the target virtual object;

determine the target virtual object as an ability casting target corresponding to a second ability, when a second trigger operation on a second ability control meets an ability continuous casting condition, the second trigger operation being triggered during ability casting of the first ability; and control the first virtual object to cast the second ability on the target virtual object.

* * * * *